United States Patent [19]
Davidson et al.

[11] Patent Number: 5,636,551
[45] Date of Patent: Jun. 10, 1997

[54] METHOD OF MAKING A MECHANICAL CABLE

[75] Inventors: Daniel F. Davidson; Jerry L. Johnson, both of Flagstaff; David J. Myers, Camp Verde; Vincent L. Perko, Flagstaff, all of Ariz.

[73] Assignee: W. L. Gore & Associates, Inc., Newark, Del.

[21] Appl. No.: 366,697

[22] Filed: Dec. 30, 1994

Related U.S. Application Data

[63] Continuation-in-part of Ser. No. 182,900, Jan. 18, 1994, abandoned, which is a continuation-in-part of Ser. No. 878,805, May 4, 1992, abandoned.

[51] Int. Cl.$^6$ .............................................. F16C 1/10
[52] U.S. Cl. .................. 74/502.5; 23/434; 428/212; 428/304.4; 74/500.5; 74/501.5 R
[58] Field of Search ................ 74/500.5–502.6; 428/212, 288, 304.4; 29/434

[56] References Cited

U.S. PATENT DOCUMENTS

| | | | |
|---|---|---|---|
| 3,176,538 | 4/1965 | Hurlow | 74/502.5 |
| 3,223,564 | 12/1965 | Buschman | 156/53 |
| 3,756,004 | 9/1973 | Gore | 156/53 X |
| 3,887,761 | 6/1975 | Gore | 156/53 X |
| 3,953,566 | 4/1976 | Gore | 264/288 |
| 4,052,911 | 10/1977 | Feldstein | 74/502.5 |
| 4,099,425 | 7/1978 | Moore | 74/502.5 |
| 4,187,390 | 2/1980 | Gore | 428/331 |
| 4,193,319 | 3/1980 | Langford | 74/501 R |
| 4,300,408 | 11/1981 | Yoshifuji | 74/501.5 R |
| 4,362,069 | 12/1982 | Giatras et al. | 74/502.5 |
| 4,475,820 | 10/1984 | Mulligan | 74/502.5 |
| 4,529,564 | 7/1985 | Harlow | 264/127 |
| 4,732,629 | 3/1988 | Cooper et al. | 156/53 |
| 4,746,541 | 5/1988 | Marikar et al. | 427/126.1 |
| 4,781,971 | 11/1988 | Marikar et al. | 428/212 |
| 4,826,725 | 5/1989 | Harlow | 264/127 |
| 4,972,846 | 11/1990 | Owens et al. | 74/502.5 X |
| 5,045,600 | 9/1991 | Giatras et al. | 74/502.5 |
| 5,161,427 | 11/1992 | Fukuda et al. | 74/502.4 |
| 5,239,304 | 8/1993 | Egashira | 74/502.4 X |
| 5,241,880 | 9/1993 | Mizobata et al. | 74/502.5 |
| 5,353,626 | 10/1994 | Davidson et al. | 74/502.4 X |
| 5,363,719 | 11/1994 | Johnson et al. | 74/502.4 |

FOREIGN PATENT DOCUMENTS

| | | | |
|---|---|---|---|
| 2323054 | 4/1977 | France | 74/502.5 |
| 2554895 | 5/1985 | France | 74/502.4 |
| 1906635 | 2/1969 | Germany | 74/502.5 |
| 2203531 | 1/1972 | Germany | 74/502.5 |
| 61-228112 | 11/1986 | Japan | 74/501.5 R |
| 1491988 | 11/1977 | United Kingdom | 74/502.4 |

OTHER PUBLICATIONS

"New Thermoplastic Compounds For Automotive Cable Liners" Plastics Engineering, Sep. 1990; 25–28.

*Primary Examiner*—Vinh T. Luong
*Attorney, Agent, or Firm*—Wayne D. House

[57] ABSTRACT

A method of making a mechanical cable having a steel wire core, a layer of fluoropolymer adhesive covering the steel wire core, and an outer layer of porous PTFE covering the layer of fluoropolymer adhesive. The mechanical cable may be a component of a mechanical cable system wherein the mechanical cable slides axially or rotates within a surrounding support tube. The support tube preferably has an inner surface comprised of non-porous PTFE. The support tube may optionally incorporate a contamination seal at the ends of the support tube to reduce the entrance of contaminating dirt and water into the system. The layer of porous PTFE covering the steel wire core may optionally be filled with a lubricating and abrasion resistant filler such as graphite.

13 Claims, 5 Drawing Sheets

METHOD OF MAKING A MECHANICAL CABLE

CROSS-REFERENCE TO RELATED APPLICATIONS

This application is a continuation-in-part of application Ser. No. 08/182,900 filed Jan. 18, 1994, now abandoned, which is a continuation-in-part of application Ser. No. 07/878,805 filed May 4, 1992, now abandoned.

FIELD OF THE INVENTION

This invention relates to the field of mechanical cables for use in tensile, push-pull and rotary applications.

BACKGROUND OF THE INVENTION

For most applications involving mechanical cables it is desirable to have a minimum of friction between the cable and any friction-generating surface which the moving cable may contact. Such friction-generating surfaces include posts, saddles, pulleys or enclosing support tubes. Attributes of long life and minimal maintenance are desirable for all applications.

Various coverings have been applied to the cable surface and used for the support tube inner surface to improve the performance of mechanical cables. For example, DE 1,906,635 to Bowden Controls, Ltd. describes a push-pull cable having a cable covering of solid, non-porous polytetrafluoroethylene that operates within a support tube of a thermoplastic having greater compressive strength than the polytetrafluoroethylene cable covering. Various thermoplastic materials for the support tube are described, including polyamides, polyacetyls, polyolefins, polyethylenes and synthetic polyesters. Support tubes of polytetrafluoroethylene (hereinafter PTFE) were found to be unacceptable because of relatively short life spans. The PTFE support tubes failed by embedding the cable into the surface of the support tube and finally wearing through the wall of the support tube.

U.S. Pat. No. 4,099,425 teaches the construction of a cable conduit or support tube for use with a push-pull cable. The inner surface of the support tube is made by die-forming a tape of microporous PTFE into the shape of a tube and subsequently providing the resulting tube with surrounding outer layers of supporting thermoplastic material such as nylon. The microporous PTFE tape is described as being 0.09 mm thick and 65 percent porous as a function of bulk volume; the tape has a microstructure of nodes interconnected by fibrils. The die-forming process results in a tubular form produced by rolling the tape lengthwise in the fashion of a cigarette wrap. The fibrils of the tape are oriented parallel to the length of the tape and consequently are also parallel to the length of the formed tube. It is further stated that a lubricant may be applied to the microporous inner surface of the support tube. Support tubes of this type having an inner surface of microporous PTFE have been found, however, to have a short life span due to poor abrasion resistance.

SUMMARY OF THE INVENTION

The present invention is a method of making a mechanical cable having a steel wire core, a layer of fluoropolymer adhesive covering the steel wire core and an outer layer of helically-wrapped porous PTFE tape surrounding the layer of fluoropolymer adhesive. The layer of fluoropolymer adhesive may be fluorinated ethylene propylene, hereinafter FEP, or perfluoro(alkoxy ethylene)/tetrafluoroethylene copolymer, hereinafter PFA. It has been found that such a cable, operating in contact with any friction-generating surface such as a post, saddle, pulley or enclosing support tube, is surprisingly effective in comparison to known systems such as those described previously. The increased effectiveness is measured in terms of reduced operating friction or longer life-span.

Mechanical cables of the present invention may be used in tensile, push-pull and rotary applications.

The outer porous PTFE layer may optionally contain a filler of a lubricating and abrasion resistant material such as graphite.

The mechanical cable of the present invention is believed to be particularly advantageous as a bicycle gear-shifting cable because of its low friction, low maintenance and long life span. The cable is also expected to offer advantages in other applications where these attributes are desirable.

DETAILED DESCRIPTION OF THE INVENTION

Figure 1:
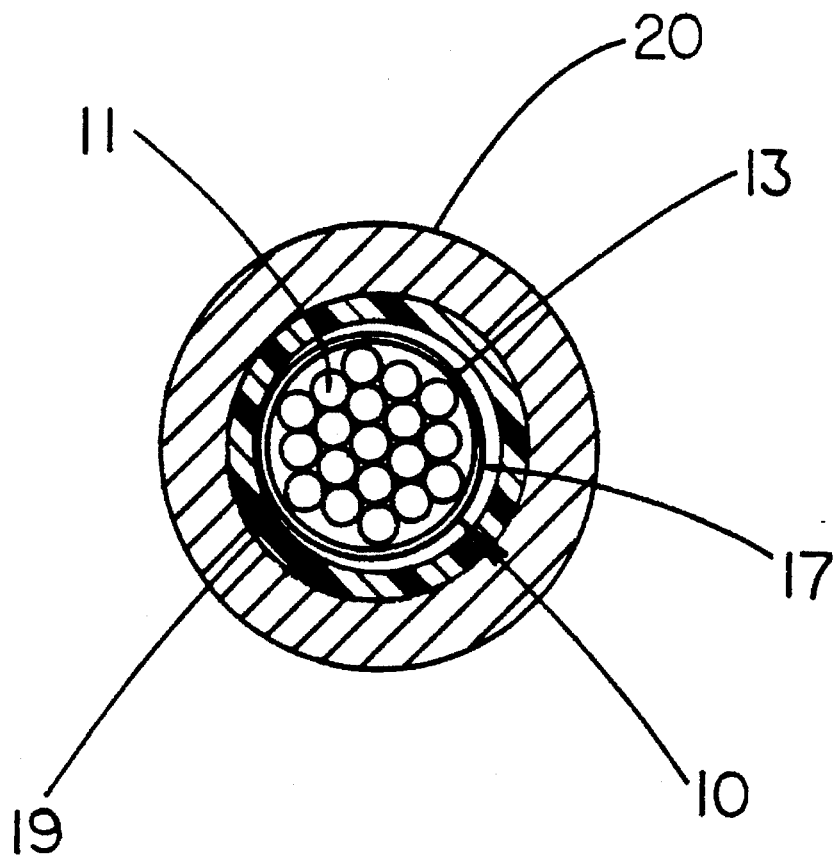
FIG. 1 shows a cross section of one embodiment of the mechanical cable of the present invention operating in a non-porous PTFE support tube that is in turn surrounded by an optional metal housing.

FIG. 1 describes a cross section of one embodiment of the mechanical cable 10 of the present invention. Steel wire core 11 is covered by a fluoropolymer adhesive layer 13 which is in turn covered by an outer layer of porous PTFE 17. The cable is shown operating within a support tube 19, preferably having an inner surface of non-porous PTFE. The support tube 19 is enclosed by an optional conventional flexible metal housing 20.

The preferred wire cores for the mechanical cables of the present invention are of multiply-stranded steel wire 11 for increased flexibility. Single strand wire may be used if substantial flexibility is not required.

A fluoropolymer adhesive layer 13 is preferably applied over the steel wire 11 by extrusion through round dies in order to produce a uniform, round surface over which to apply the outer layer of porous PTFE 17. The extruded fluoropolymer adhesive 13 thus acts as a filler between the wire strand interstices of multiply stranded wires. The resulting cable having a uniform, round surface is believed to produce less wear and friction when working against the inner surface of the support tube 19 than does the non-uniform surface of the multiply-stranded steel cable. The support tube 19 may optionally be enclosed by a conventional flexible metal housing 20 such as those made of helically wound wire.

Alternatively, the fluoropolymer adhesive layer 13 may be applied in the form of a thin tape wrapped around the surface of the wire core.

The outer layer of porous PTFE is preferably of porous expanded PTFE having a microstructure of nodes interconnected by fibrils, made as taught by U.S. Pat. Nos. 4,187,390 and 3,953,566 herein incorporated by reference. A film of porous expanded PTFE may be conveniently cut into tapes, preferably of length parallel to the direction of the fibrils, which in turn may be tape-wrapped about a steel wire core covered by a layer of fluoropolymer adhesive using conventional tape-wrapping techniques. Such a covering may be very thin, such as about 0.013 mm to 0.050 mm, so that the diameter of the steel wire 11 is not appreciably increased. While thicker coverings such as about 0.25 mm may be used to maximize the useful life of the covered cable, it is believed that coverings of only 0.08 mm thickness are capable of providing good life spans for bicycle shift cable applications.

The outer layer of porous expanded PTFE 17 is caused to become adhered to the wire by heating to cause the fluoropolymer adhesive layer to melt. If the porous expanded PTFE has been applied as a helically wound tape, the covered cable should be heated to cause circumferentially oriented fibrils of the tape to shrink and thereby further increase the adhesion of the porous expanded PTFE tape to the wire core. Shrinkage of the tape during heating forces the melted fluoropolymer adhesive into the void space of at least the inner surface of the porous PTFE tape.

Figure 2:
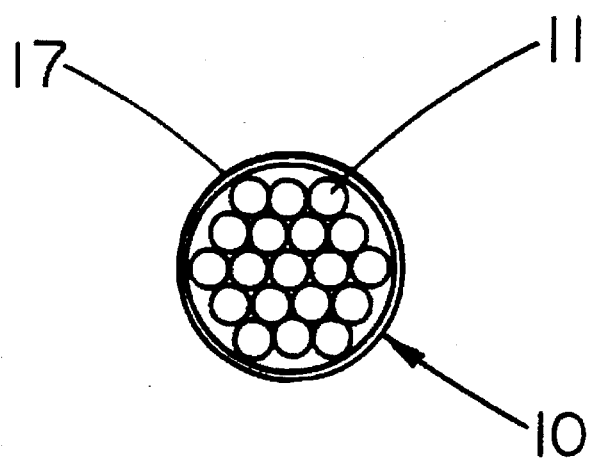
FIG. 2 shows a cross section of an alternative embodiment of the mechanical cable of the present invention having an outer covering of porous expanded PTFE tape applied directly over the wire surface.

In an alternative embodiment, shown by the cross section of FIG. 2, the steel wire core may be covered by a helically wrapped tape of porous, expanded PTFE 17 without the use of a fluoropolymer adhesive layer. Adhesion of the outer layer of porous, expanded PTFE tape to the steel wire core 11 is accomplished by heating the helically wrapped tape adequately to cause the fibrils within the microstructure of the tape to shrink. The tape consequently shrinks longitudinally and thereby securely grips the surface of the steel wire. The fibrils must be oriented in a direction with enough of a circumferential component around the wire surface after wrapping to result in good adhesion of the tape to the wire surface after heating to cause shrinkage.

The porous PTFE covering of the inventive cable may be identified by removing a sample of the material covering the steel cable with a sharp blade and microscopically examining the outer surface of the sample. The porosity of the PTFE, even for relatively low amounts of porosity such as about 10 percent, is visibly apparent under microscopic examination. Scanning electron microscopy is particularly useful for this examination. The void spaces within the porous PTFE layer may be filled with air or with other material such as the fluoropolymer adhesive. Regardless, the difference between the PTFE and the filled or unfilled void space is distinguishable.

Additionally, non-porous PTFE is considered to have a density of about 2.2 g/cc. The porous PTFE used as the cable covering of the present invention has a bulk density at 23° C. of less than about 2.0 g/cc and preferably less than about 1.9 g/cc. These bulk densities assume that the void space contains no fillers such as the FEP or PFA adhesives.

The mechanical cable is preferably operated within a support tube 19 having an inner surface of non-porous PTFE. The support tube 19 may be comprised entirely of a non-porous fluoropolymer such as PTFE without a conventional flexible metal housing 20 if the housing is not required for protection against exterior mechanical damage or to support curved portions of the cable system to limit flexing and longitudinal compression of the support tube 19. The support tube may optionally incorporate contamination seals at the tube ends to reduce or prevent ingress of dirt, water or other contamination. The use of contamination seals at the ends of bicycle gearshift cables is well known.

An additional advantage of the mechanical cable of the present invention is that for many applications, crimp or compression terminations may be applied to the cable ends without requiring that the porous PTFE covering be removed from the cable end prior to fitting the termination. For bicycle gearshift cable applications, for example, the force required to pull a crimped termination off of the cable end, the termination having previously been fitted over the porous PTFE covered cable end, was more than four times the force applied to the cable during gear shifting. Other conventional means for terminating the cable may also be used, such as, for example, screw-type cable clamps.

Figure 2A:
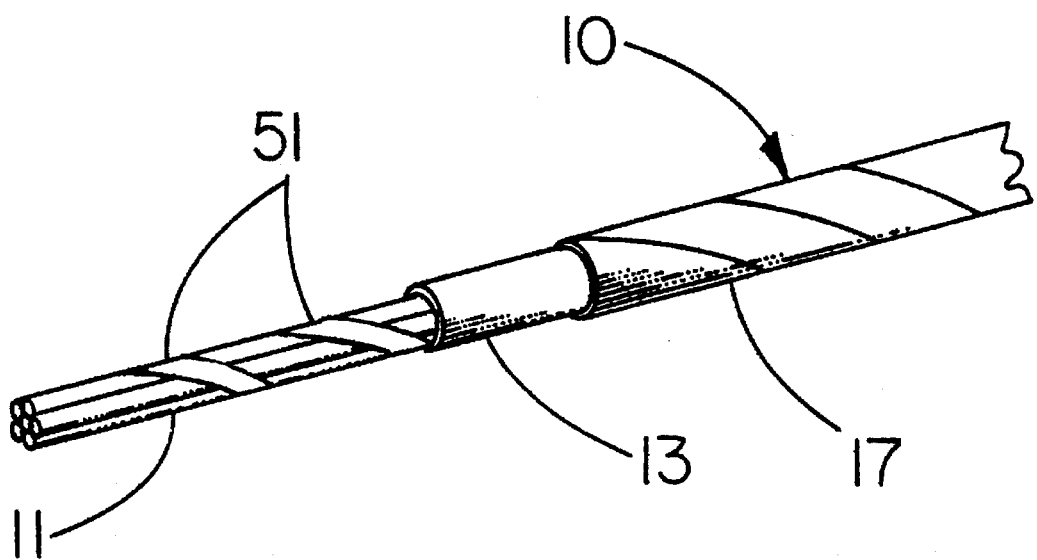
FIG. 2A describes a perspective view of an alternative embodiment of a mechanical cable of the present invention incorporating an optional helical wrapping of tape applied around a multiply stranded wire surface prior to the application of fluoropolymer adhesive and outer helical wrapping of tape.

It has also been found that a particularly effective mechanical cable for pushing applications is possible with a variation of the above construction methods. This embodiment uses a multiply stranded wire wherein the multiple strands are parallel to each other and to the longitudinal axis of the cable without any appreciable helical orientation about that axis. A helical wrapping of the previously described porous PTFE tape is applied to the exterior surface of the group of multiple strands to hold them together. The parallel characteristic of the multiple wire strands, without appreciable helical orientation, in combination with the wrapping of porous PTFE tape about the multiple wire strands, provides the resulting mechanical cable with both good flexibility and good compression resistance appropriate for pushing applications. While it is preferred that the helical wrapping of porous PTFE tape cover the entire visible surface of the multiply stranded cable it is believed that a wrapping of porous PTFE tape that leaves the metal surface of the wire exposed between adjacent wraps will function satisfactorily. FIG. 2A shows a perspective view of this embodiment wherein the prior helical wrapping of porous PTFE tape 51 is applied around steel wire core 11 prior to the application of the surrounding layer of fluoropolymer adhesive 13 and subsequent helical wrapping of porous PTFE tape 17. Full coverage of the entire surface of the steel wire core 11 by the prior helical wrapping of porous PTFE tape 51 is believed preferable because a more uniform cable surface results. After the prior helical wrapping of porous PTFE tape 51 is applied, the surrounding layer of fluoropolymer adhesive 13 is applied by melt extrusion over the tape-wrapped wire core 11. This is followed by additional helical wrapping of porous PTFE tape 17 over the surface of the layer of fluoropolymer adhesive 13, which is in turn followed by the application of heat above the melt point of the layer of fluoropolymer adhesive 13 in order to adhere the porous PTFE tape 17 to the steel wire core 11. A preferred method of applying heat following the final exterior tape wrapping with porous PTFE tape is to pull the covered cable through a heated tubular finishing die wherein the interior surface of the die contacts the exterior surface of the cable with a slight amount of interference. The use of such a finishing die will be subsequently described in further detail.

Various different examples of the mechanical cables of the present invention were manufactured and comparatively tested. All examples used a helically wrapped covering of a tape cut from a film of porous expanded PTFE made according to the teachings of U.S. Pat. 3,953,566 and 4,187,390. The fibrils within the tape microstructure were substantially parallel to the length of the tape. The tape used was 12.7 mm wide, 0.013 mm thick and was about 75 percent porous with a bulk density of about 0.55 g/cc, meaning the bulk volume of the tape contained 75 percent void space. The tape was applied using conventional tape wrapping equipment intended for covering electrical wires with insulating tape. The tape was applied with a pitch angle of 25 degrees measured from the longitudinal axis of the wire core using a tape tension of about 2.5 g. Two applications of tape were provided to all samples unless specified otherwise. Alternate applications of tape were provided from opposite directions so that the helical windings of the alternate applications were opposed to each other rather than parallel.

It is anticipated that the frictional and wear characteristics may be varied somewhat by varying the porosity and fibril length of the porous, expanded PTFE tape. Porosity and fibril length may be varied as taught by U.S. Pat. No. 3,953,566 and 4,187,390; fibril length is measured as taught by U.S. Pat. 4,972,846.

A conventional multiply stranded bare steel wire core was used for all of the comparative examples. This cable was of 1.2 mm diameter and contained 19 individual wire strands, the strands being parallel and having a slight helically oriented twist about the longitudinal axis of the wire core.

Mechanical cable samples were made by tape-wrapping the porous expanded PTFE directly onto the bare steel surface of the wire. After tape-wrapping, the wrapped length of wire was placed into an air convection oven set at 400° C. for a period of about 5.5 minutes to cause the overlapping layers of porous expanded PTFE tape to thermally bond to each other and to cause the tape to adhere to the cable by shrinkage of the fibrils within the tape microstructure during exposure to the heat. Shrinkage of the fibrils causes the tape to reduce in length if the fibrils are parallel to the length, with the result that the tape more tightly grips and adheres to the surface of the wire. Five applications of tape were found to be necessary to achieve a thick enough covering to have the desired service life. Fewer layers of a thicker porous PTFE tape could be expected to provide similar life.

Figure 2B:
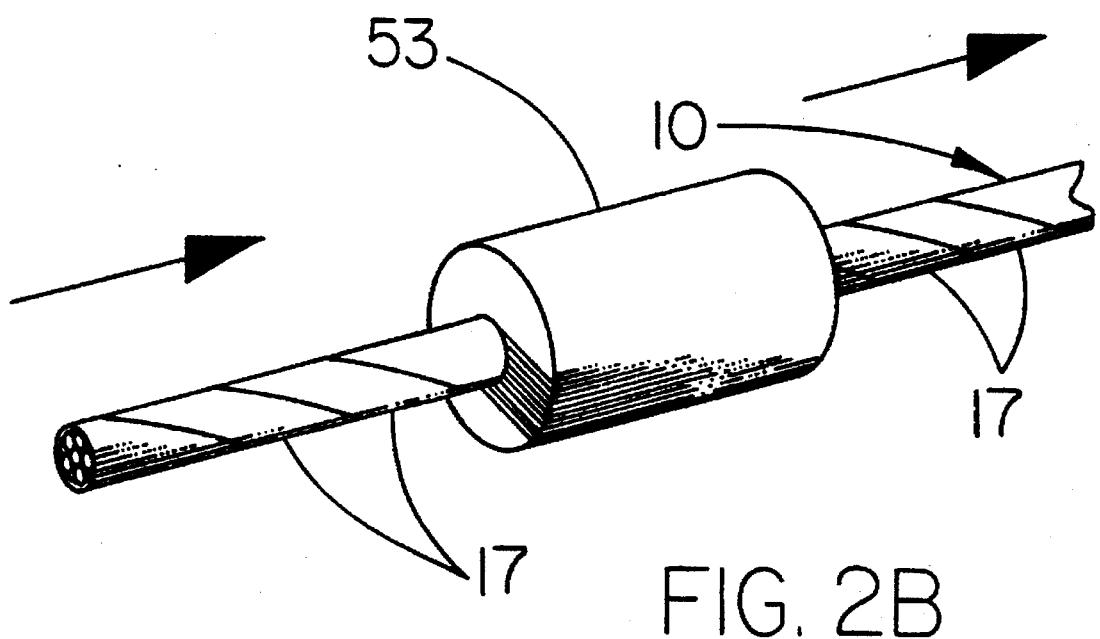
FIG. 2B describes a perspective view of a preferred method of heating the fluoropolymer adhesive coated, helically tape-wrapped wire by pulling it through a heated tubular finishing die having an interference fit over the coated and tape-wrapped wire.

The porous PTFE covered cable can optionally be run through a finishing die if it is desired to produce a uniform surface of slightly reduced porosity. FIG. 2B describes a perspective view of the use of such a heated tubular finishing die 53 through which fluoropolymer adhesive coated, helically tape-wrapped cable is pulled as a preferred means of heating mechanical cable 10 adequately to melt the surrounding layer of fluoropolymer adhesive 13. A die 53 heated to about 400° C., having an interior surface with a bore diameter 0.05 mm less than the diameter of the cable to be fed through the die, and having a 9.5 mm length of the interior surface contacting the cable surface, was found to produce a desirable uniform finish and diameter when the cable was fed through the die at 1.5 meters per minute. The use of such a finishing die also improves the adhesion of the porous PTFE tape 17 to the wire core 11 by forcing the porous PTFE tape into the layer of fluoropolymer adhesive 13 while the adhesive 13 is heated above its melt point.

Additional examples were made having a covering of fluoropolymer adhesive, either FEP 100 or PFA 340 (Du Pont de Nemours, Inc, Wilmington, Del.), melt extruded over the surface of the bare steel wire core prior to tapewrapping with porous expanded PTFE. A Killion model KL-100 hot melt extruder was used with a 12.7 mm diameter male tip and 13.6 mm diameter female die; both the FEP and the PFA were heated to a temperature set at 380° C. during extrusion. The extrusions were done at a rate of 16.8 meters per minute. These extrusions resulted in coating layers about 0.05 mm thick; layers of 0.025 mm thickness were found to be less effective in adhering the porous PTFE tape to the wire. These thicknesses were measured by subtracting the outside diameter of the wire with the extruded coating from the maximum outside diameter of the multiply stranded bare steel wire prior to coating and finally dividing the result of the subtraction by two.

The use of a fluoropolymer adhesive such as FEP or PFA is believed to be preferred for two reasons. First, the use of such an adhesive appears to improve the adhesion of the porous PTFE to the wire. Second, the use of an extruded adhesive produces a smooth outer surface having a relatively uniform circular cross section by filling in the interstitial spaces between adjacent wire strands at the surface of the steel wire core. The resulting smoother surface is believed to produce less operating friction and longer life in the resulting mechanical cable.

Two applications of the porous expanded PTFE tape covering were applied over the extruded fluoropolymer adhesive by tape wrapping as described previously. The resulting cables were placed into an air convection oven set at 350° C. for a period of 3 minutes for the FEP coated samples and at 398° C. for 2 minutes for the PFA coated samples. It was found that if too little heat was applied during this step that the adhesion of the porous PTFE tape would be poor, resulting in early failure of the covering during use of the cable by substantial areas of the tape coming off of the wire. Ordinary experimentation with oven temperatures and dwell times may be necessary to optimize adhesion of the porous PTFE tape; it is apparent that temperatures above the melt point of the chosen fluoropolymer adhesive should be used.

Figure 3:
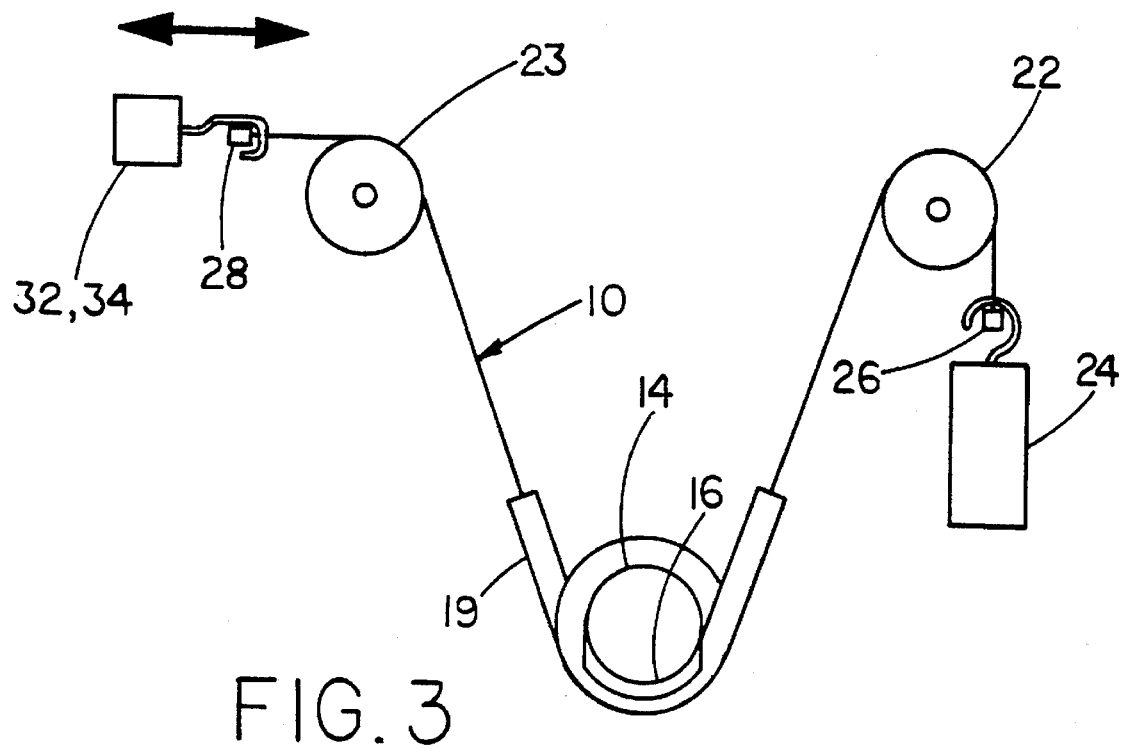
FIG. 3 describes an end view of a test fixture used to evaluate the frictional and wear characteristics of push-pull cables.
Figure 4:
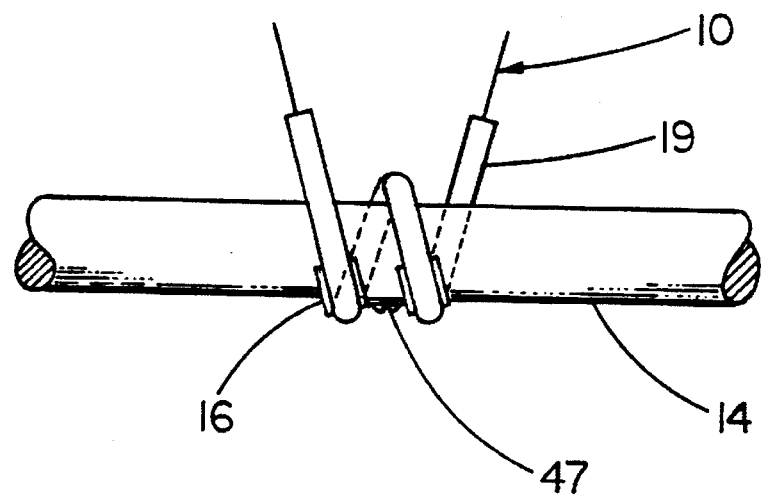
FIG. 4 shows a side view of a portion of the test fixture of FIG. 3.

For evaluation, the completed cables were cut to a length of about 2.4 m and inserted into a non-porous PTFE support tube of about 25 cm length, 1.6 mm inside diameter, 2.5 mm outside diameter and 2.15 g/cc density. As shown by FIG. 3 and FIG. 4, the cable 10 and support tube 19 assembly was wrapped around the outer surface of a 3.8 cm diameter, horizontally oriented length of cylindrical steel bar stock 14. A cable guide 16 (Shimano, Inc., Osaka, Japan, Part No. SM-SP55), was secured by a machine screw 47 to the lower surface of the cylindrical bar 14 and used to locate the support tube. The support tube 19 was wrapped around the cylindrical bar 14 and located by the cable guide 16, for a total of about 490 degrees to provide severe frictional and wear conditions. The portions of the support tube 19 in contact with the cylindrical bar 14 and cable guide 16 were secured to those surfaces by wrapping securely with duct tape. One cable end was routed over a freely-rotating pulley 22, beyond which a 1.17 kg weight 24 was hung from a first screw-type cable clamp termination fitting 26. A second opposite cable end termination 28, also a screw-type cable clamp, was routed over a second freely rotating pulley 23 and attached to an Ametek Hunter spring gauge 32 which was then used to measure the force required to lift the 1.17 kg weight 24 by pulling the cable 10 through the support tube 19 wrapped around the cylindrical bar 14.

After the preliminary force measurement, the Ametek Hunter spring gauge was removed from the second cable termination 28 and secured to a horizontally oriented actuator 34, which was in turn attached to a connecting rod driven by an electric gear motor and crankshaft. The actuator 34 was used to cycle the push-pull cable and attached 1.17 kg weight 24 for a stroke length of 3.81 cm at a rate of 33.3 cycles/minute. The cable was typically operated for a total of 2500 cycles, after which it was removed from the actuator and again attached to the Ametek Hunter spring gauge for a second force measurement. After the second force measurement, one termination was removed from a cable end and the cable was withdrawn from the support tube for visual examination of wear to the cable and tube. The evaluation results are summarized in Table 1. Example 1 was comprised of the steel wire core having a covering of porous expanded PTFE tape applied directly to the surface of the bare steel wire. Example 2 was the same as Example 1 except that a layer of FEP adhesive had been extruded onto the steel wire core prior to tape-wrapping with the porous expanded PTFE tape. Example 3 was the same as Example 1 except that a layer of PFA adhesive had been extruded onto the steel wire core prior to tape-wrapping with the porous expanded PTFE tape. A graphite impregnated sample was made for Example 4 using a cable made according to the description of Example 3 that subsequently was impregnated with graphite by rubbing powdered graphite by hand into the surface of the porous PTFE. Finally, a bare steel cable was tested in a support tube of non-porous PTFE as a control.

Figure 5:
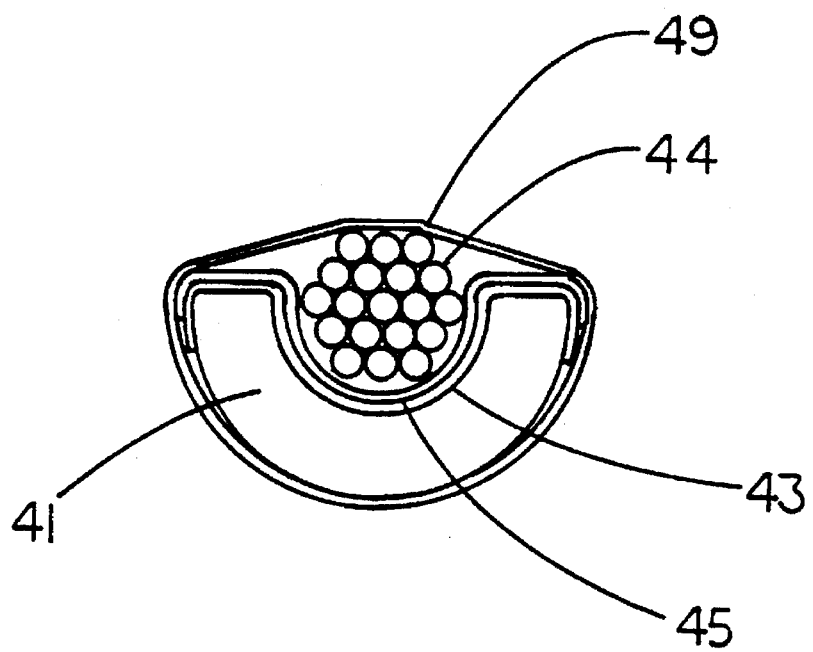
FIG. 5 describes a cross section of the manufacturing technique used to create a comparative example.

An additional comparative example was made to test a support tube inner surface of porous PTFE similar to that taught by U.S. Pat. No. 4,099,425. A 25 cm length of PTFE support tube as described previously was fed through a metal die fitted with a sharp blade with the result that the tubing was cleanly and uniformly split in half along its longitudinal axis. The remainder of the manufacturing procedure used to construct this example is shown by FIG. 5. A length of porous expanded PTFE tape 45 of 12.7 mm width, 0.05 mm thickness and about 70 percent porosity was bonded to the inner surface of one length of the split support tube 41 by first placing a strip of non-porous FEP tape 43 of 12.7 mm width and 0.025 mm thickness in contact with the inner surface of the split PTFE support tube 41 and then placing the porous expanded PTFE tape 45 onto the FEP tape 43. A piece of 1.2 mm diameter bare steel wire 44 of was then used to clamp the assembly together; the assembly was then temporarily held together with a helical wrapping of small diameter malleable wire 49. The assembly was then placed into an air convection oven set at 330° C. for a period of 3.0 minutes. The melting of the FEP tape 43 caused the 70 percent porous PTFE tape 45 to adhere to the split, non-porous PTFE support tube 41.

Figure 6:
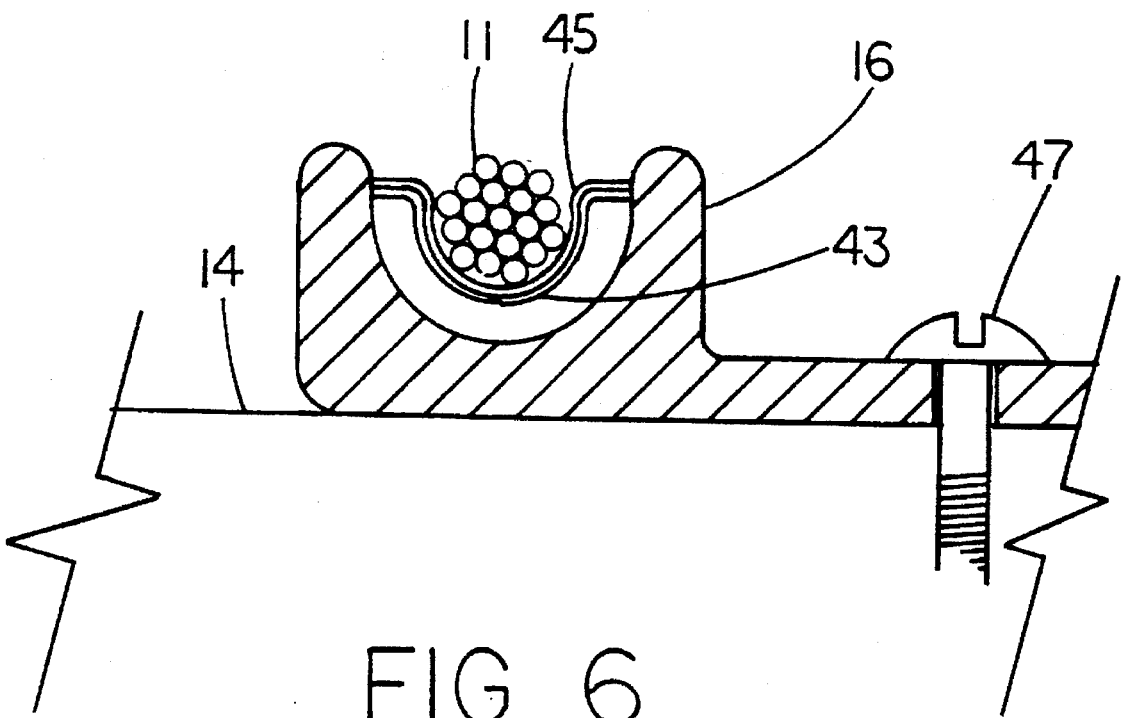
FIG. 6 describes a cross section of the testing procedure for the comparative example of FIG. 5.

After being allowed to cool, the helical wrapping of small diameter malleable wire 49 and the clamping length of 1.2 mm diameter bare steel wire 44 were removed. The assembly was wrapped around the cable guide 16 and cylindrical bar 14 as shown by FIG. 6. Because the frictional loads were applied only to the inner surface of the split support tube 41 adjacent to the surface of the cylindrical bar 14, the use of the split support tube 41 was believed to be accurately indicative of the results that could be expected using the same construction in a fully tubular form. The assembly was tested as described previously using a bare steel 19 strand cable 11 of 1.2 mm diameter. The results are shown in Table 1 as Example 5. After 880 cycles, the porous PTFE support tube liner was completely worn through over the entire length of the support tube and the cable had worn entirely through the non-porous PTFE support tube in several places.

Figure 7:
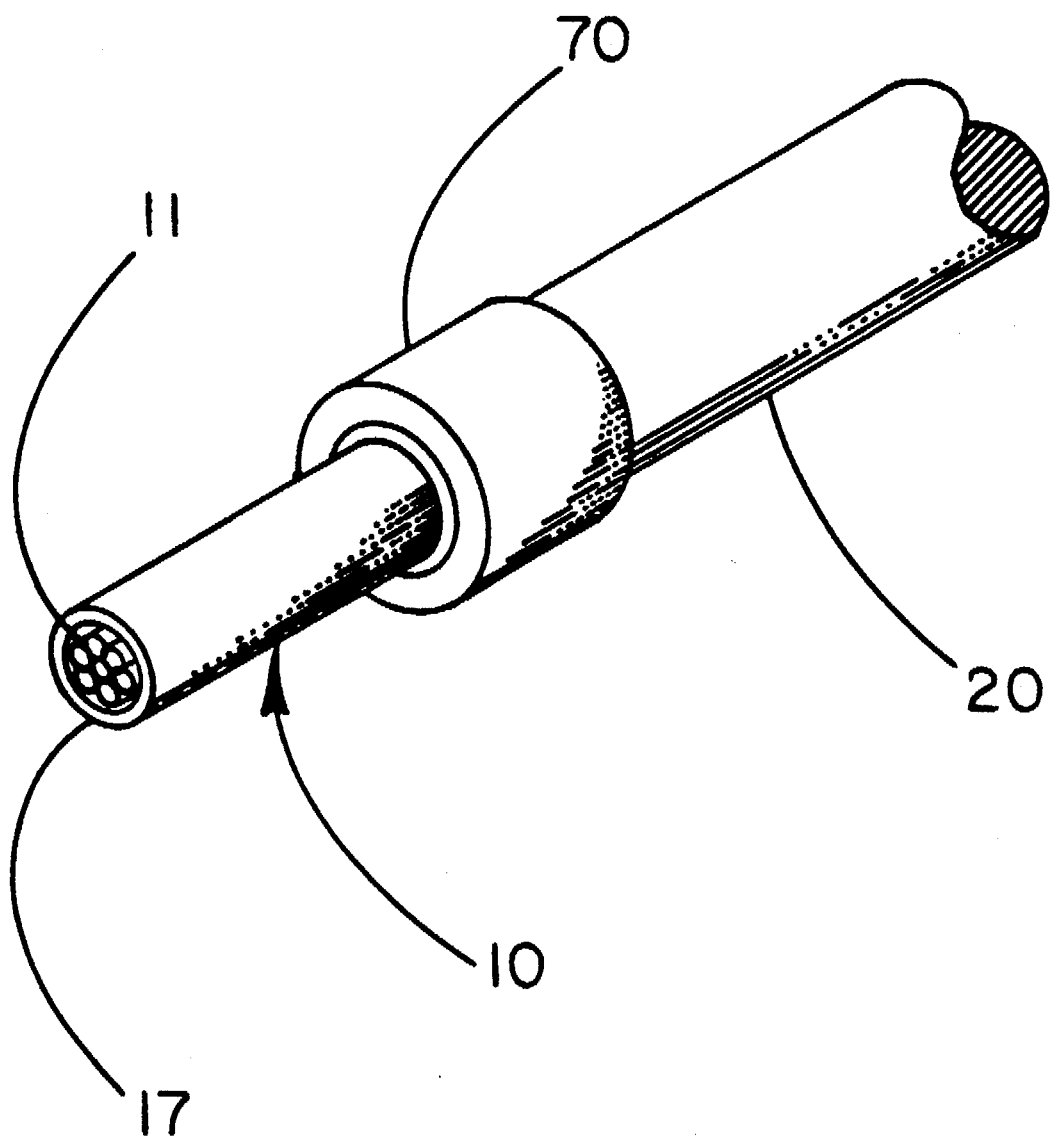
FIG. 7 describes a mechanical cable system having a cable housing fitted with a contamination seal to prevent the ingress of dirt between the cable housing and the inventive cable.

FIG. 7 describes a mechanical cable system having a cable housing 20 fitted with a contamination seal 70 to prevent the ingress of dirt between the cable housing 20 and the inventive cable 10. Contamination seal 70 can be of any appropriate design that helps to seal the space between the bore of the cable housing 20 and the outer surface of cable 10.

A control sample comprising a bare steel cable operating in a non-porous PTFE support tube was tested in the same manner as previously described. The control sample failed at 950 operating cycles by wearing holes through the wall of the support tube in several places. In comparison with both the control sample and Example 5, the porous PTFE covered cables produced surprisingly effective results.

Various means for termination of the cable ends may be used including compression crimped connectors, screw compression connectors and connectors formed by casting directly onto the surface of the cable end. It was found that for some applications including bicycle gearshift cable applications that crimped connectors may be fitted without the necessity of stripping the cable covering from surface of the cable ends.

A length of cable made according to the description of Example 3 was cut into about 10 cm lengths. Tubular aluminum crimp connectors were made from 2011 T3 alloy to serve as termination fittings. The tubular crimp connectors were of 3.97 mm outside diameter, 1.32 mm inside diameter and 4.8 mm length. These connectors were applied to opposite ends of three of the 10 cm cable lengths by compressing the each connector between two opposing flat surfaces across a connector diameter with the result that the connector was flattened, having an elongate cross section with a diameter of 3.3 mm between the flattened surfaces. One connector of the same type was fitted by the above method to each end of three 10 cm lengths of bare steel cable of the same type previously described. The six cable samples, three coated and three bare steel, were then subjected to tensile testing to determine the amount of force necessary to pull one tubular crimp free from the cable to which it had been crimped. Tension was applied to the two opposite crimp connectors on a single cable sample using an Instron model 1011 tensile tester with a 454 kg load cell at a rate of 12.7 cm/minute. The force value at which the crimp connector failed was read from the Instron tester.

Four bare cable samples and five covered cable samples were made and tested as described above except that the connectors were crimped using a three jaw lathe chuck torqued to 4.8 kg-m.

Mean failure values are presented in Table 2. The force required to remove the crimp connectors from the PTFE covered cables was substantially in excess of the approximately 4 kg force required to shift a rear bicycle derailleur by pulling or pushing the bicycle handlebar end of a typical gearshift cable assembly.

A length of steel bicycle gearshift cable housing was cut to an approximate length for use as part of a gearshift cable assembly on a ROCK COMBO™ bicycle (Specialized Bicycle Components, Inc., Morgan Hill, Calif.). A non-porous PTFE support tube of the type described previously was fitted into the steel bicycle cable housing as an inner liner. A 1.2 mm diameter 19 strand length of bare steel cable was provided with a covering of helically wound porous PTFE tape as described previously, without the use of a fluoropolymer adhesive. An appropriate length of this porous PTFE cable was fitted into the bore of the liner shift cable housing; the ends of the shift cable housing were then fitted with Shimano end caps having built-in rubber o-ring seals. The resulting bicycle gearshift cable assembly was fitted to the bicycle in place of the conventional shift cable which comprised a steel housing with a thermoplastic liner and bare steel shift cable. A reduction in gear shifting effort was immediately observed. The bicycle was ridden approximately 600 miles to determine the effectiveness of the new shift cable during lengthy use. It was estimated that approximately 9000 gear shifts occurred during the 600 miles. Gear shifting effort was subjectively observed to be low at the end of the 600 miles. Further, no adjustments, cleaning, lubrication, or other maintenance was required during the 600 mile test. The porous PTFE covered cable and non-porous PTFE support tube were removed from the housing at the end of the 600 mile test and examined. No holes were visible in either the support tube or the cable covering.

TABLE 1

| Example No. | N | Extruded FEP Adhesive | Extruded PFA Adhesive | Graphite Impreg. | Mean Force to Pull Before Cyc. Test(g) | No. Test Cycles | Mean Force to Pull After Cyc. Test(g) |
| --- | --- | --- | --- | --- | --- | --- | --- |
| 1 | 1 | No | No | No | 2680 | 2500 | 3010 |
| 2 | 1 | Yes | No | No | 1980 | 2500 | 3010 |
| 3 | 2 | No | Yes | No | 2100 | 2500 | 2790 |
| 4 | 1 | No | Yes | Yes | 2740 | 2500 | 3310 |
| 5 | 2 | No | No | No | 2970 | 880 | 3120 |
| Control | 1 | No | No | No | 2100 | 950 | 2610 |

TABLE 2

| Mean Force To Remove Crimp Connector, Kg | | | |
| --- | --- | --- | --- |
| Flattened Crimp | | Three-Jaw Chuck Crimp | |
| Bare Cable | Coated Cable | Bare Cable | Coated Cable |
| 22.04 | 19.65 | 74.01 | 31.78 |

We claim:

1. A method of making a mechanical cable comprising:
   a) applying a surrounding layer of fluoropolymer adhesive to a steel wire core;
   b) helically wrapping a tape about the surrounding layer of fluoropolymer adhesive, said tape comprising porous polytetrafluoroethylene; and
   c) applying heat adequate to melt the surrounding layer of fluoropolymer adhesive, thereby causing the tape to adhere to the steel wire core.

2. A method according to claim 1 wherein said steel wire core is a multiply stranded steel wire core.

3. A method according to claim 2 wherein a prior helical wrapping of tape is applied about the multiply stranded steel wire core, prior to applying the surrounding layer of fluoropolymer adhesive to the multiply stranded steel wire core, said prior helical wrapping of tape comprising porous polytetrafluoroethylene.

4. A method according to claim 1 wherein said fluoropolymer adhesive is chosen from the group consisting of fluorinated ethylene propylene and perfluoroalkoxy.

5. A method according to claim 4 wherein said steel wire core is a multiply stranded steel wire core.

6. A method according to claim 1 wherein said heat is applied by pulling the wire core through a heated tubular finishing die having an interior surface so that said tape contacts the interior surface of the heated tubular finishing die.

7. A method according to claim 6 wherein said steel wire core is a multiply stranded steel wire core.

8. A method according to claim 6 wherein said fluoropolymer adhesive is chosen from the group consisting of fluorinated ethylene propylene and perfluoroalkoxy.

9. A method according to claim 8 wherein said steel wire core is a multiply stranded steel wire core.

10. A method according to claim 1 wherein the porous polytetrafluoroethylene has a microstructure including fibrils.

11. A method according to claim 2 wherein the porous polytetrafluoroethylene has a microstructure including fibrils.

12. A method according to claim 4 wherein the porous Polytetrafluoroethylene has a microstructure including fibrils.

13. A method according to claim 1 wherein the porous polytetrafluoroethylene tape contains a graphite filler.

* * * * *